United States Patent
Cantero Clares et al.

(10) Patent No.: US 12,256,058 B2
(45) Date of Patent: Mar. 18, 2025

(54) IMAGE PROCESSING METHOD AND VIRTUAL REALITY DISPLAY SYSTEM

(71) Applicant: Acer Incorporated, New Taipei (TW)

(72) Inventors: Sergio Cantero Clares, New Taipei (TW); Wen-Cheng Hsu, New Taipei (TW); Shih-Hao Lin, New Taipei (TW); Chih-Haw Tan, New Taipei (TW)

(73) Assignee: Acer Incorporated, New Taipei (TW)

( * ) Notice: Subject to any disclaimer, the term of this patent is extended or adjusted under 35 U.S.C. 154(b) by 155 days.

(21) Appl. No.: 17/969,656

(22) Filed: Oct. 19, 2022

(65) Prior Publication Data

US 2024/0137483 A1 Apr. 25, 2024
US 2024/0236293 A9 Jul. 11, 2024

(51) Int. Cl.
*H04N 13/398* (2018.01)
*G06T 7/50* (2017.01)
*G06T 17/20* (2006.01)
*G06T 19/20* (2011.01)
*H04N 13/383* (2018.01)

(52) U.S. Cl.
CPC .............. *H04N 13/383* (2018.05); *G06T 7/50* (2017.01); *G06T 17/20* (2013.01); *G06T 19/20* (2013.01); *H04N 13/398* (2018.05); *G06T 2207/10028* (2013.01)

(58) Field of Classification Search
None
See application file for complete search history.

(56) References Cited

U.S. PATENT DOCUMENTS

| 5,714,997 A | 2/1998 | Anderson |
| 2007/0168650 A1* | 7/2007 | Misra ................ G06F 9/544 |
| | | 712/220 |

(Continued)

FOREIGN PATENT DOCUMENTS

| TW | 202230287 | 8/2022 |
| WO | 2019213392 | 11/2019 |

OTHER PUBLICATIONS

Schreer O et al., "3D Videocommunication: Algorithms, Concepts and Real-time Systems in Human Centred Communication", Jul. 2005, pp. 1-17.

*Primary Examiner* — Anh-Tuan V Nguyen
(74) *Attorney, Agent, or Firm* — JCIPRNET (57) ABSTRACT

An exemplary embodiment of the invention provides an image processing method for a virtual reality display system. The method includes: enabling a first shared buffer and a second shared buffer; performing an image capturing operation to obtain a first image from a virtual reality scene; storing the first image to the first shared buffer; in response to that the storing of the first image is finished, reading the first image from the first shared buffer; performing a depth estimation operation on the first image to obtain depth information corresponding to the first image; storing the depth information to the second shared buffer; in response to that the storing of the depth information is finished, reading the depth information from the second shared buffer; performing an image generation operation according to the depth information to generate a pair of second images corresponding to the virtual reality scene; and outputting the pair of second images by a display of the virtual reality display system.

18 Claims, 7 Drawing Sheets

(56) References Cited

U.S. PATENT DOCUMENTS

| | | | |
|---|---|---|---|
| 2008/0150945 A1* | 6/2008 | Wang | G06T 7/50 |
| | | | 348/E13.02 |
| 2008/0165287 A1 | 7/2008 | Doswald et al. | |
| 2013/0346698 A1* | 12/2013 | Waugh | G06F 12/0862 |
| | | | 711/125 |
| 2014/0168244 A1* | 6/2014 | Akenine-Moller | G06T 1/60 |
| | | | 345/557 |
| 2017/0278303 A1* | 9/2017 | Groh | G06T 15/205 |
| 2017/0280090 A1* | 9/2017 | Raskin | H04N 13/30 |
| 2018/0096453 A1* | 4/2018 | Edwards | G06T 15/405 |
| 2018/0247457 A1* | 8/2018 | Nadler | G06F 3/012 |
| 2019/0035165 A1 | 1/2019 | Gausebeck | |
| 2019/0317599 A1 | 10/2019 | Akenine-Moller et al. | |
| 2019/0354844 A1* | 11/2019 | Brasnett | G06N 3/02 |
| 2019/0385356 A1 | 12/2019 | Lodato et al. | |
| 2020/0126301 A1* | 4/2020 | Kim | H04N 13/279 |
| 2021/0034221 A1 | 2/2021 | Phaisanwiphatpong | |
| 2021/0098535 A1* | 4/2021 | Cai | H10K 59/879 |
| 2021/0352261 A1 | 11/2021 | Watson et al. | |
| 2022/0191454 A1 | 6/2022 | Babu et al. | |
| 2022/0215532 A1* | 7/2022 | Aghdasi | G06T 19/006 |
| 2023/0018560 A1* | 1/2023 | Briggs | G06F 3/012 |
| 2023/0410338 A1* | 12/2023 | Liu | G06T 7/55 |

\* cited by examiner

IMAGE PROCESSING METHOD AND VIRTUAL REALITY DISPLAY SYSTEM

BACKGROUND OF THE INVENTION

Field of the Invention

The invention relates to an image processing technology and particularly relates to an image processing method and a virtual reality display system.

Description of Related Art

With the advancement of technology, virtual reality devices have become more and more popular. Because the generation of virtual reality scene requires a huge amount of computation, when the user's position in the virtual reality scene changes or the view direction of the user changes, the traditional virtual reality device generally uses the processor (software) to repeatedly calculate and update the virtual reality scene, and then the left eye image and the right eye image viewed by the user may be obtained from the updated virtual reality scene. However, the above-mentioned calculation method often causes a great burden on the processor in the virtual reality device.

SUMMARY OF THE INVENTION

The invention provides an image processing method and a virtual reality display system, which can effectively resolve the above problems.

An exemplary embodiment of the invention provides an image processing method for a virtual reality display system. The image processing method includes: enabling a first shared buffer and a second shared buffer; performing an image capturing operation to obtain a first image from a virtual reality scene, wherein the first image includes a two-dimensional image, and the virtual reality scene is generated based on a three-dimensional mesh; storing the first image to the first shared buffer; in response to that the storing of the first image is finished, reading the first image from the first shared buffer; performing a depth estimation operation on the first image to obtain depth information corresponding to the first image; storing the depth information to the second shared buffer; in response to that the storing of the depth information is finished, reading the depth information from the second shared buffer; performing an image generation operation according to the depth information to generate a pair of second images corresponding to the virtual reality scene, wherein the pair of second images comprises a left-eye image and a right-eye image; and outputting the pair of second images by a display of the virtual reality display system.

Another exemplary embodiment of the invention provides a virtual reality display system which includes a first shared buffer, a second shared buffer, a display and at least one processor coupled to the first shared buffer, the second shared buffer and the display. The at least one processor is configured to: enabling the first shared buffer and the second shared buffer; performing an image capturing operation to obtain a first image from a virtual reality scene, wherein the first image includes a two-dimensional image, and the virtual reality scene is generated based on a three-dimensional mesh; storing the first image to the first shared buffer; in response to that the storing of the first image is finished, reading the first image from the first shared buffer; performing a depth estimation operation on the first image to obtain depth information corresponding to the first image; storing the depth information to the second shared buffer; in response to that the storing of the depth information is finished, reading the depth information from the second shared buffer; performing an image generation operation according to the depth information to generate a pair of second images corresponding to the virtual reality scene, wherein the pair of second images comprises a left-eye image and a right-eye image; and outputting the pair of second images through the display.

Based on the above, after a first shared buffer and a second shared buffer are enabled, an image capturing operation is performed to obtain a first image from a virtual reality scene, wherein the first image includes a two-dimensional image, and the virtual reality scene is generated based on a three-dimensional mesh. Then, the first image is stored to the first shared buffer. In response to that the storing of the first image is finished, the first image is read from the first shared buffer, and a depth estimation operation is performed on the first image to obtain depth information corresponding to the first image. Then, the depth information is stored to the second shared buffer. In response to that the storing of the depth information is finished, the depth information is read from the second shared buffer, and an image generation operation is performed according to the depth information to generate a pair of second images corresponding to the virtual reality scene, wherein the pair of second images comprises a left-eye image and a right-eye image. Then, the pair of second images is output by a display of the virtual reality display system. Therefore, by using the shared buffers between different image processing procedures, the efficiency of image processing in the virtual reality display system can be improved.

In order to make the aforementioned and other objectives and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
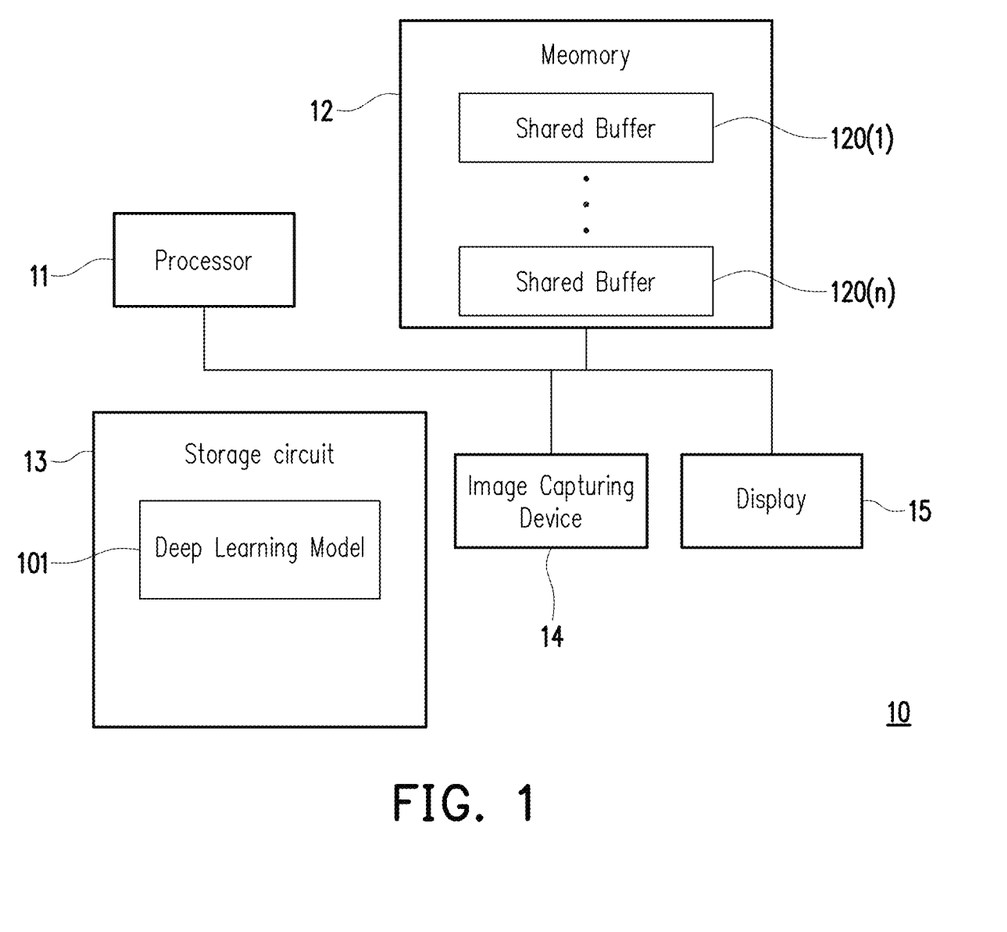
FIG. 1 is a schematic diagram of a virtual reality display system according to an embodiment of the invention.

FIG. 1 is a schematic diagram of a virtual reality display system according to an embodiment of the invention.

Referring to FIG. 1, the virtual reality display system 10 may be implemented in an electronic device such as a smart phone, a notebook, a tablet computer, a personal computer, a server, a game host, a portable electronic device, a head mounted display (HMD) device or the like, which has the abilities of image processing and data computing.

The virtual reality display system 10 includes a processor 11, a memory 12, a storage circuit 13, an image capturing device 14 and a display 15. The processor 11 is responsible for overall or partial operations of the virtual reality display system 10. For example, the processor 11 may include a central processing unit (CPU), a graphic processing unit (GPU) or other programmable general-purpose or special-purpose microprocessor, a digital signal processor (DSP), a programmable controller, an application specific integrated circuit (ASIC), a programmable logic device (PLD), or other similar device or a combination of these devices. The number of the processor 11 may be one or more, which is not limited by the invention.

The memory 12 is coupled to the processor 11 and is configured to temporarily store data. Particularly, the memory 12 may include a volatile storage circuit. The volatile storage circuit is configured to store data in a volatile manner. For example, the volatile storage circuit may include a random access memory (RAM) or a similar volatile storage medium. The number of the memory 12 may be one or more, which is not limited by the invention.

The storage circuit 13 is coupled to the processor 11 and is configured to store data. Particularly, the storage circuit 13 may include a non-volatile storage circuit. The non-volatile storage circuit is configured to store data in a non-volatile manner. For example, the non-volatile storage circuit may include a read only memory (ROM), a solid state drive (SSD), and/or a traditional hard disk drive (HDD) or a similar non-volatile storage medium. The number of the storage circuit 13 may be one or more, which is not limited by the invention.

The image capturing device 14 is coupled to the processor 11 and is configured to capture a face image or an eyeball image of a user. For example, the image capturing device 14 may include at least one lens and at least one photosensitive element. The lens and the photosensitive element can be packed into a camera module. The number of the image capturing device 14 may be one or more, which is not limited by the invention.

The display 15 is coupled to the processor 11 and is configured to display virtual reality images (also referred to as stereoscopic images). For example, the display 15 may include a head mounted display (HMD) or an autostereoscopic display. The display 15 may present a left-eye image and a right-eye image in the virtual reality images by interleave or at the same time based on a stereoscopic image display technology, such as a parallax barriers technology, a lenticular lenses technology or directional backlight technology.

In an embodiment, the display 15 (which is a head mounted display) may include a left-eye display panel and a right-eye display panel respectively configured to display the left-eye image and the right-eye image in the virtual reality images. By watching the left-eye image and the right-eye image, the user may mistakenly think that he is in a virtual reality space because of the virtual reality images presented by the display 15.

Figure 2:
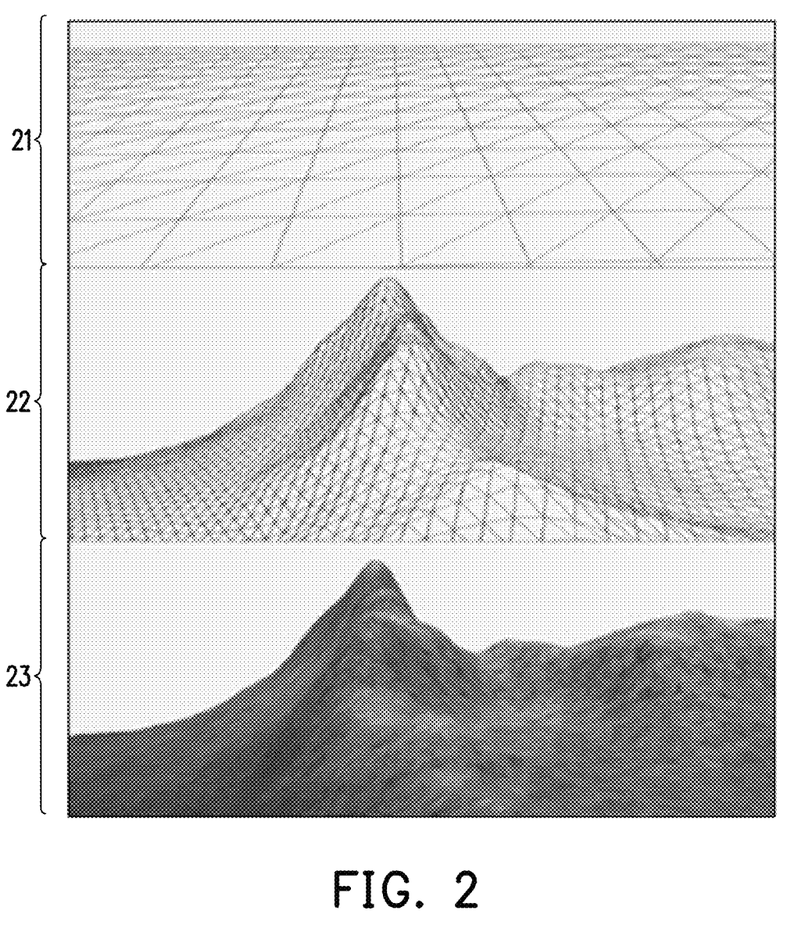
FIG. 2 is a schematic diagram of a two-dimensional (2D) mesh, a three-dimensional (3D) mesh and a virtual reality scene according to an embodiment of the invention.

FIG. 2 is a schematic diagram of a two-dimensional (2D) mesh, a three-dimensional (3D) mesh and a virtual reality scene according to an embodiment of the invention.

Referring to FIG. 2, a region 21 is a schematic diagram of a two-dimensional mesh, a region 22 is a schematic diagram of a three-dimensional mesh, and a region 23 is a schematic diagram of a virtual reality scene (also referred to as a three-dimensional scene). In order to generate the virtual reality scene in region 23, the two-dimensional mesh in the region 21 may be generated first. For example, in the region 21, the two-dimensional mesh includes a plurality of triangles sequentially arranged in a X-Y plane. By adjusting the height in a Z-axis direction of each triangle on the X-Y plane, the three-dimensional mesh in the region 22 may be obtained. In an embodiment, the height in the Z-axis direction of the surface of the three-dimensional mesh may be regarded as the depth of the three-dimensional mesh. Then, in a drawing procedure, the texture corresponding to each triangle may be drawn or pasted onto the three-dimensional mesh in the region 22 to obtain the virtual reality scene in the region 23. In an embodiment, the drawing procedure may be performed by a vertex shader executed by the processor 11.

Figure 3:
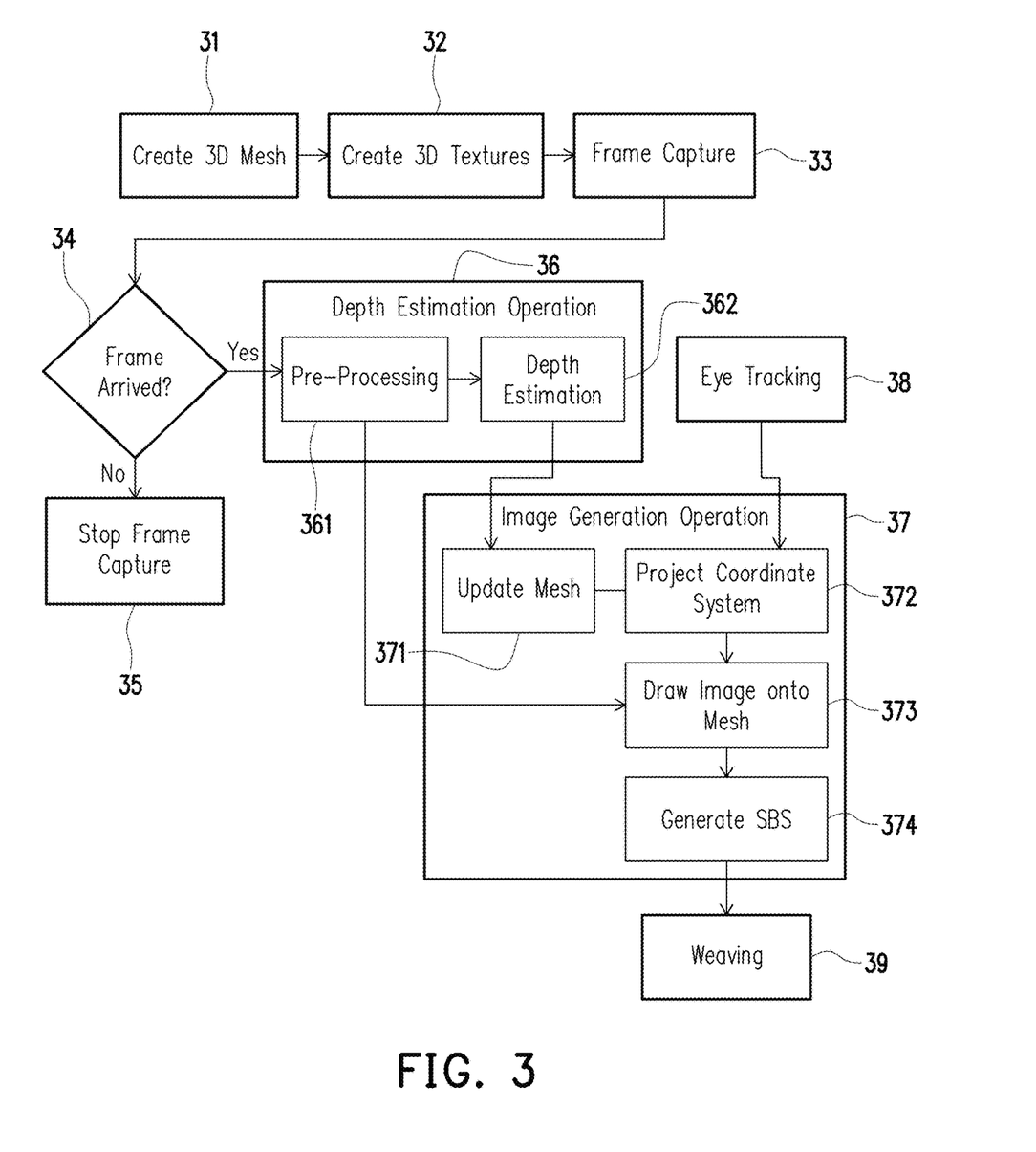
FIG. 3 is a schematic diagram of the image processing method according to an embodiment of the invention.

FIG. 3 is a schematic diagram of the image processing method according to an embodiment of the invention.

Referring to FIG. 1 and FIG. 3, in a block 31, the processor 11 creates a three-dimensional mesh (e.g., the three-dimensional mesh shown in the region 22 of FIG. 2) corresponding to a virtual reality scene (e.g., the virtual reality scene shown in the region 23 of FIG. 2). In a block 32, the processor 11 creates the texture corresponding to each of the triangle in the three-dimensional mesh and then draws or pastes the textures onto the corresponding triangles in the three-dimensional mesh to generate the virtual reality scene. In other words, the virtual reality scene is generated based on the three-dimensional mesh.

In a block 33, the processor 11 starts to capture images from the virtual reality scene. To be specific, the processor 11 may perform an image capturing operation to obtain an image (also referred to as a first image) from the virtual reality scene. The first image includes a two-dimensional image which reflects a view of the virtual reality scene. In an embodiment, each image corresponds to one frame, and in one frame cycle, one frame (i.e., one image) may be captured from the virtual reality scene.

In a block 34, the processor 11 determines whether a frame is arrived. For example, If the virtual reality images corresponding to the virtual reality scene is successfully generated at a block 39, then the processor 11 may determine that the frame is arrived and then a block 36 can be executed. Otherwise, if the virtual reality images corresponding to the virtual reality scene is not successfully generated at the block 39, then the processor 11 may determine that the frame is not arrived and then a block 35 can be executed. In block 35, the processor 11 stops the frame capture of block 33.

In the block 36, the processor 11 performs a depth estimation operation on the first image to obtain depth information corresponding to the first image. The depth information is configured to describe an estimated depth distribution of the pixels (or the positions) in the first image. For example, the depth information includes a depth map. The value of each pixel (or position) in the depth map may indicate an estimated depth value of a corresponding pixel (or position) in the first image.

In an embodiment, the storage circuit 13 stores a deep learning model 101. The deep learning model 101 is implemented based on a neural network structure, such as Convolutional Neural Networks (CNN) or the like. The deep learning model 101 is configured to estimate (i.e., predict) the depth of each pixel (or position) in the first image. In an embodiment, in block 36, the processor 11 executes the deep learning model 101 to perform the depth estimation operation. The number of the deep learning model 101 may be one or more, which is not limited by the invention.

In an embodiment, the estimation accuracy of the deep learning model 101 may be improved by training of the deep learning model 101. In the training stage, lots of training images may be input to the deep learning model 101 for analyzation and training. The deep learning model 101 may output the depth estimation result for each training image. By comparing the depth estimation result with authentication data corresponding to each training image, the decision parameters (e.g., the weights) used in the deep learning model 101 may be optimized, and then the estimation accuracy of the deep learning model 101 may be improved correspondingly.

In an embodiment, the block 36 includes a block 361 and a block 362. In the block 361, the processor 11 performs an image pre-processing operation on the first image to generate another image (also referred to as third image) which meets an input requirement of the deep learning model 101. For example, in the image pre-processing operation, the processor 11 may adjust the size and/or transform the format of the first image to generate the third image. The third image with the adjusted size and/or the transformed format meets the input requirement of the deep learning model 101 for performing the depth estimation thereon.

In the block 362, the processor 11 analyzes the third image by the deep learning model 101 to obtain the depth information corresponding to the first image. For example, in the depth estimation of block 362, the processor 11 inputs the third image to the deep learning model 101 and then receives the output of the deep learning model 101 with respect to the third image. The output of the deep learning model 101 with respect to the third image may include a depth map. For example, the value of each pixel (or position) in the depth map may indicate an estimated depth value of a corresponding pixel (or position) in the third image. The processor 11 may serve the depth map as the depth information corresponding to the first image.

In a block 37, the processor 11 performs an image generation operation according to the depth information to generate a pair of images (also referred to as second images) corresponding to the virtual reality scene. The pair of second images include a left-eye image and a right-eye image. The display 15 may play the pair of second images (i.e., the left-eye image and the right-eye image) to present the virtual reality scene to the user.

In an embodiment, in a block 38, the processor 11 performs an eye tracking operation on the user through the image capturing device 14. In the eye tracking operation, the processor 11 detects or tracks the eyeball position from the face image or the eyeball image of the user.

In an embodiment, in the block 37, the processor 11 updates the virtual reality scene according to the depth information, the first image and an eye tracking result of the eye tracking operation. Then, the processor 11 obtains the pair of second images from the updated virtual reality scene.

In an embodiment, the block 37 includes blocks 371 to 374. In the block 371, the processor 11 updates the three-dimensional mesh according to the depth information. For example, the processor 11 adjusts a part of the depths (i.e., heights in the Z-axis direction) of the three-dimensional mesh according to the depth information.

In the block 372, the processor 11 projects a coordinate system on the three-dimensional mesh according to the eye tracking result. For example, when the user wears a head mounted display or watch an autostereoscopic display, the user may change his/her view direction by moving his/her head or eyeballs. In response to the change of the view direction, the processor 11 needs to change the view of the virtual reality scene presented to the user in real-time. In the block 372, the processor 11 may re-locate, map or project the central point of the view direction onto the three-dimensional mesh.

In the block 373, the processor 11 draws the first image onto the three-dimensional mesh. For example, after the view direction of the user is re-locate, map or project onto the three-dimensional mesh and the depth of the three-dimensional mesh is updated, the first image may be drawn onto the surface of the three-dimensional mesh to obtain the updated virtual reality scene.

In the block 374, the processor 11 generates the side-by-side (SBS) images according to the updated virtual reality scene. For example, the processor 11 may use a left camera and a right camera, respectively, to capture the left-eye image and the right-eye image in the pair of second images from the updated virtual reality scene. Then, the processor 11 may set the left-eye image and the right-eye image as the side-by-side images for the current frame cycle. Then, the side-by-side images (i.e., the pair of second images) may be output by the display 15 to present the updated virtual reality scene to the user.

Furthermore, in an embodiment, in a block 39, the processor 11 may perform an image weaving operation on the side-by-side images (i.e., the pair of second images) to generate weaved images. For example, when the weaved images are displayed, the left-eye image and the right-eye image may be display by interleave.

In an embodiment, the memory 12 includes shared buffers 120(1)-120(n). In an embodiment, before the first image is obtained by the image capturing operation, the processor 11 may enable at least two of the shared buffers 120(1)-120(n). One of the enabled shared buffers among the shared buffers 120(1)-120(n) may be regarded as a first shared buffer, and another one of the enabled shared buffers among the shared buffers 120(1)-120(n) may be regarded as a second shared buffer. In an embodiment of FIG. 3, the first shared buffer and the second shared buffer are configured to store the first image and the depth information respectively. By using the shared buffers between different image processing procedures, the efficiency of image processing in the virtual reality display system can be improved.

Figure 4:
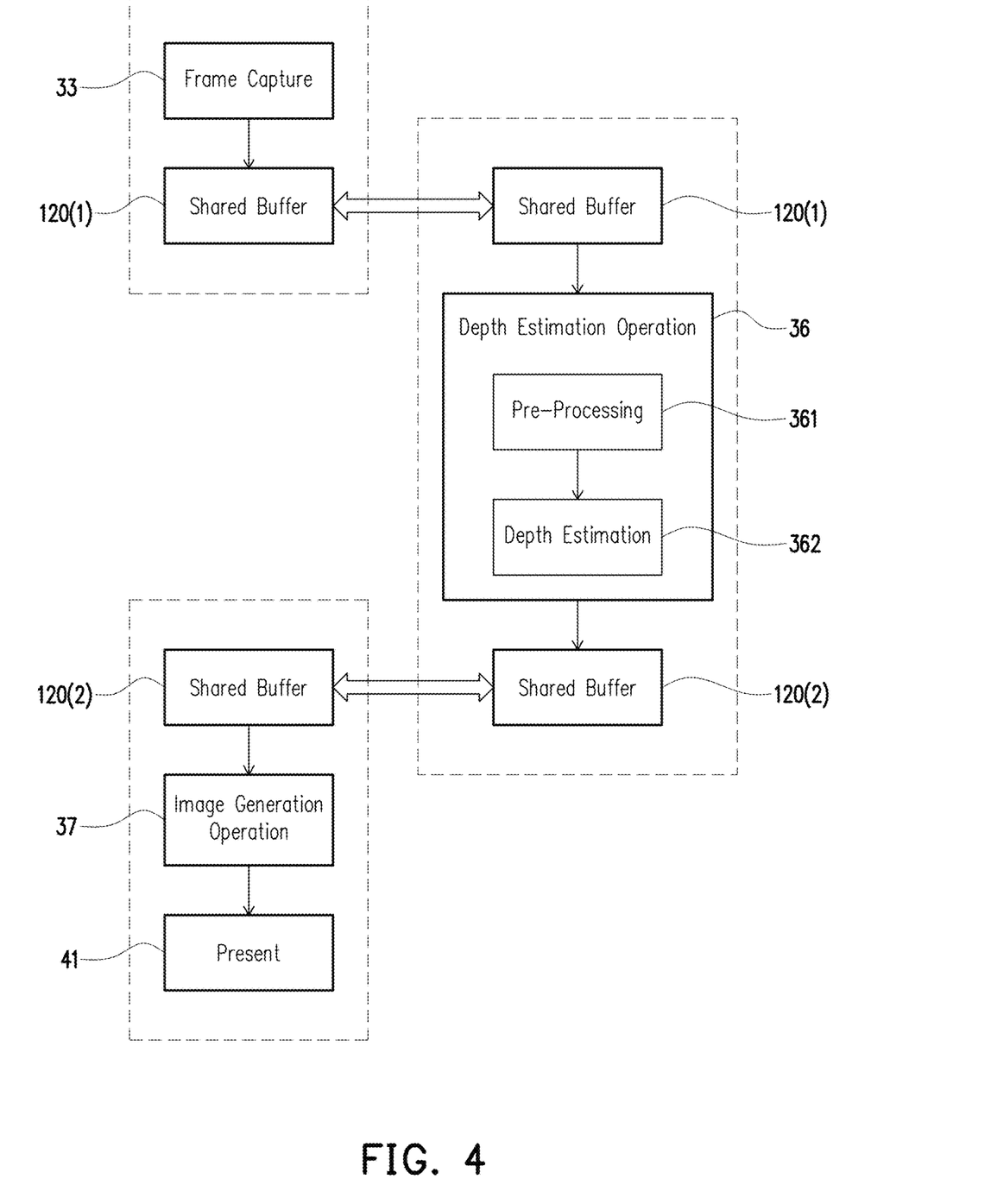
FIG. 4 is a schematic diagram of the virtual reality display system working with the shared buffers according to an embodiment of the invention.

FIG. 4 is a schematic diagram of the virtual reality display system working with the shared buffers according to an embodiment of the invention.

Referring to FIG. 1, FIG. 3 and FIG. 4, in a current frame cycle, the processor 11 temporarily stores the first image obtained by the image capturing operation in the block 33 to the shared buffer 120(1) (i.e., the first shared buffer). In response to that the storing of the first image is finished, the processor 11 may read the first image from the shared buffer 120(1).

The processor 11 may control the read and write permissions of the shared buffer 120(1) by using a control flag (also referred to as first control flag) corresponding to the shared buffer 120(1). In an embodiment, the processor 11 may set the value of the first control flag as a specific bit value (also referred to as a first bit value) to allow the shared buffer 120(1) to be written (i.e., write the first image to the shared buffer 120(1)) and prohibit the shared buffer 120(1) to be read. In an embodiment, the processor 11 may set the value of the first control flag as another bit value (also referred to as a second bit value) to allow the shared buffer 120(1) to be read (i.e., read the first image from the shared buffer 120(1))

and prohibit the shared buffer 120(1) to be written. The first bit value is different from the second bit value. For example, the first bit value is "0" and the first bit value is "1" or the first bit value is "1" and the first bit value is "0", which is not limited by the invention.

In response to that the storing of the first image is finished, the processor 11 may update the first control flag. For example, in response to that the storing of the first image is finished, the processor 11 may change the first control flag from the first bit value to the second bit value. Then, the processor 11 may read the first image from the shared buffer 120(1) according to the updated first control flag.

The first image read from the shared buffer 120(1) is processed by the depth estimation operation of the block 36 (including the blocks 361 and 362) to obtain the depth information corresponding to the first image. Then, the processor 11 may temporarily stores the depth information to the shared buffer 120(2) (i.e., the second shared buffer). In response to that the storing of the depth information is finished, the processor 11 may read the depth information from the shared buffer 120(2).

The processor 11 may control the read and write permissions of the shared buffer 120(2) by using another control flag (also referred to as second control flag) corresponding to the shared buffer 120(2). In an embodiment, the processor 11 may set the value of the second control flag as the first bit value to allow the shared buffer 120(2) to be written (i.e., write the depth information to the shared buffer 120(2)) and prohibit the shared buffer 120(2) to be read. In an embodiment, the processor 11 may set the value of the second control flag as the second bit value to allow the shared buffer 120(2) to be read (i.e., read the depth information from the shared buffer 120(2)) and prohibit the shared buffer 120(2) to be written.

In response to that the storing of the depth information is finished, the processor 11 may update the control flag (i.e., the second control flag) corresponding to the shared buffer 120(2). For example, in response to that the storing of the depth information is finished, the processor 11 may change the second control flag from the first bit value to the second bit value. Then, the processor 11 may read the depth information from the shared buffer 120(2) according to the updated second control flag.

The depth information read from the shared buffer 120(2) is processed by the image generation operation of the block 37 to obtain the pair of second images (e.g., the left-eye image and the right-eye image). Then, in a block 41, the processor 11 may control the display 15 to output the pair of second images to present the updated virtual reality scene to the user.

It is noted that, in an embodiment, the first image is used in a current frame cycle. In response to that the reading of the first image is finished, the processor 11 may store another image (also referred to as fourth image) obtain from the virtual reality scene to the shared buffer 120(1). The fourth image is used in a next frame cycle after the current frame cycle. For example, the fourth image is obtained by the image capturing operation and served as the first image for the next frame cycle.

In other words, at a specific time point, the depth information stored in the shared buffer 120(2) and the fourth image stored in the shared buffer 120(1) are used in different frame cycles. For example, at a specific time point, the depth information stored in the shared buffer 120(2) is generated based on the first image and used in a current frame cycle, while the fourth image stored in the shared buffer 120(1) is captured and used in the next frame cycle. By simultaneously processing data (e.g., the fourth image and the depth information) used in different frame cycles, the efficiency of image processing in the virtual reality display system can be improved.

In an embodiment, the depth information stored in the shared buffer 120(2) is updated based on the first image during the current frame cycle. However, in an embodiment, if the depth information stored in the shared buffer 120(2) is not updated during the current frame cycle, then, the processor 11 may perform, during the current frame cycle, the image generation operation in the block 37 according to the depth information which is generated during a previous frame cycle. Therefore, even though the depth information is not updated immediately, the pair of second images can be generated sustainably.

In an embodiment, more shared buffers among the shared buffers 120(1)-120(n) may be enabled. In an embodiment, the processor 11 may enable another shared buffer (also referred to as third shared buffer) among the shared buffers 120(1)-120(n). The processor 11 may store the third image generated by the image pre-processing operation to the third shared buffer. In response to that the storing of the third image is finished, the processor 11 may read the third image from the third shared buffer and then input the third image to the deep learning model 101.

Figure 5:
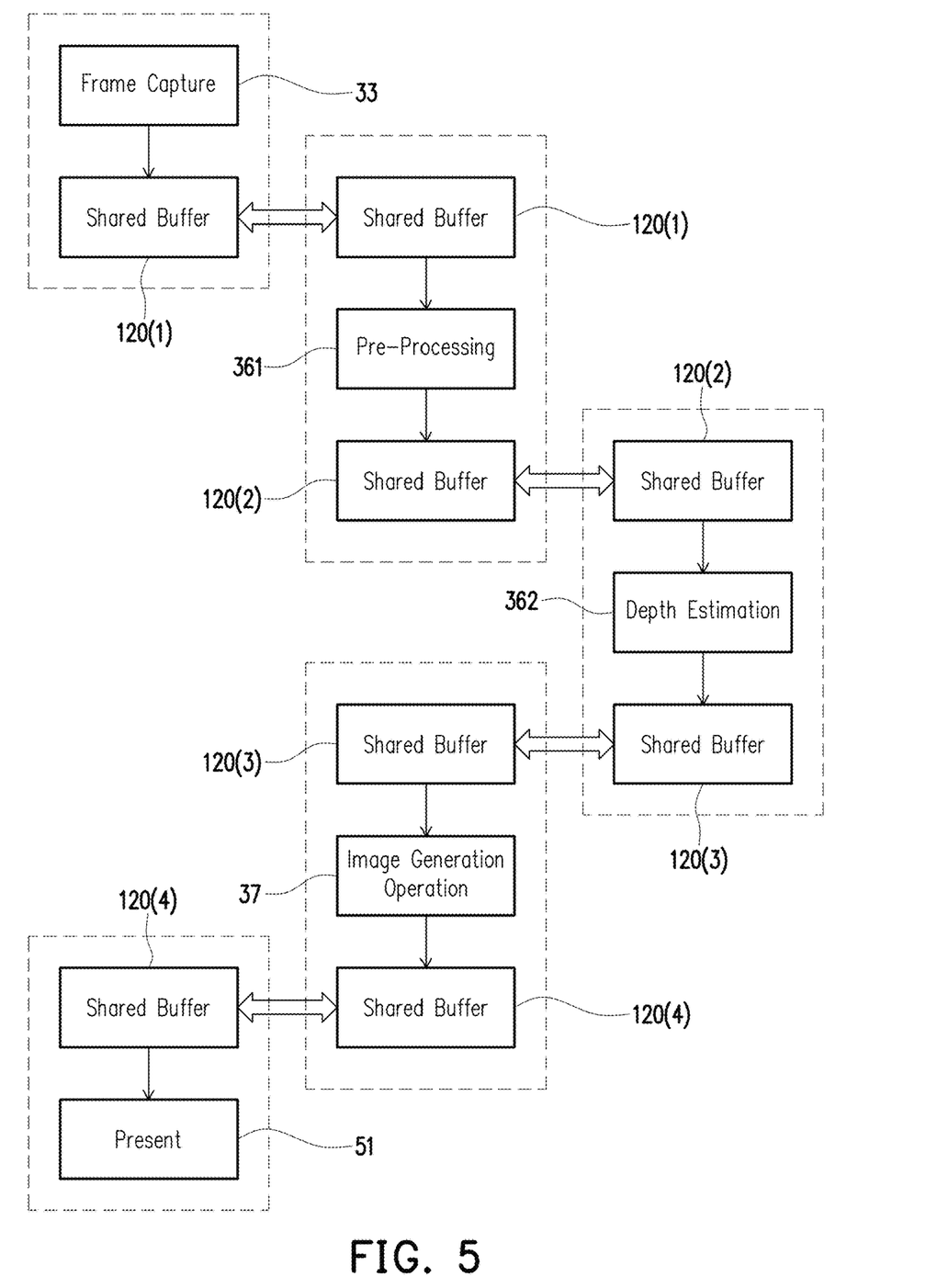
FIG. 5 is a schematic diagram of the virtual reality display system working with the shared buffers according to an embodiment of the invention.

FIG. 5 is a schematic diagram of the virtual reality display system working with the shared buffers according to an embodiment of the invention.

Referring to FIG. 1, FIG. 3 and FIG. 5, the first image obtained by the image capturing operation of block 33 may be stored to the shared buffer 120(1). In response to that the storing of the first image is finished, the first image may be read from the shared buffer 120(1) and the image pre-processing operation of the block 361 may be performed on the first image to obtain the third image which meets an input requirement of the deep learning model 101. The third image obtained by the block 361 may be stored to the shared buffer 120(2).

In response to that the storing of the third image is finished, the third image may be read from the shared buffer 120(2) and the depth estimation of the block 362 may be performed based on the third image by the deep learning model 101 to obtain the depth information corresponding to the first image. The depth information obtained by the block 362 may be stored to the shared buffer 120(3).

In response to that the storing of the depth information is finished, the depth information may be read from the shared buffer 120(3) and the image generation operation of the block 37 may be performed based on the depth information to obtain the pair of second images. The pair of second images obtained by the block 37 may be stored to the shared buffer 120(4).

In response to that the storing of the pair of second images is finished, the pair of second images may be read from the shared buffer 120(4) and the image generation operation of the block 37 may be performed based on the depth information to obtain the pair of second images. The pair of second images obtained by the block 37 may be stored to the shared buffer 120(4). Then, in a block 51, the display 15 may output the pair of second images read from the shared buffer 120(4) to present the updated virtual reality scene to the user.

It is noted that, the processor 11 may control the read and write permissions of each of the shared buffers 120(1)-120(n) by using a control flag respectively corresponding to the shared buffers 120(1)-120(n). For example, the processor 11 may set the value of a control flag corresponding to the shared buffer 120(i) as the first bit value to allow the shared buffer 120(*i*) to be written and to prohibit the shared buffer 120(*i*) to be read. Furthermore, the processor 11 may set the value of the control flag corresponding to the shared buffer 120(*i*) as the second bit value to allow the shared buffer 120(*i*) to be read and to prohibit the shared buffer 120(*i*) to be written. Therefore, data used in different frame cycles may be processed at the same time and stored in different shared buffers. By simultaneously processing data in different shared buffers, the efficiency of image processing in the virtual reality display system can be improved.

Figure 6A:
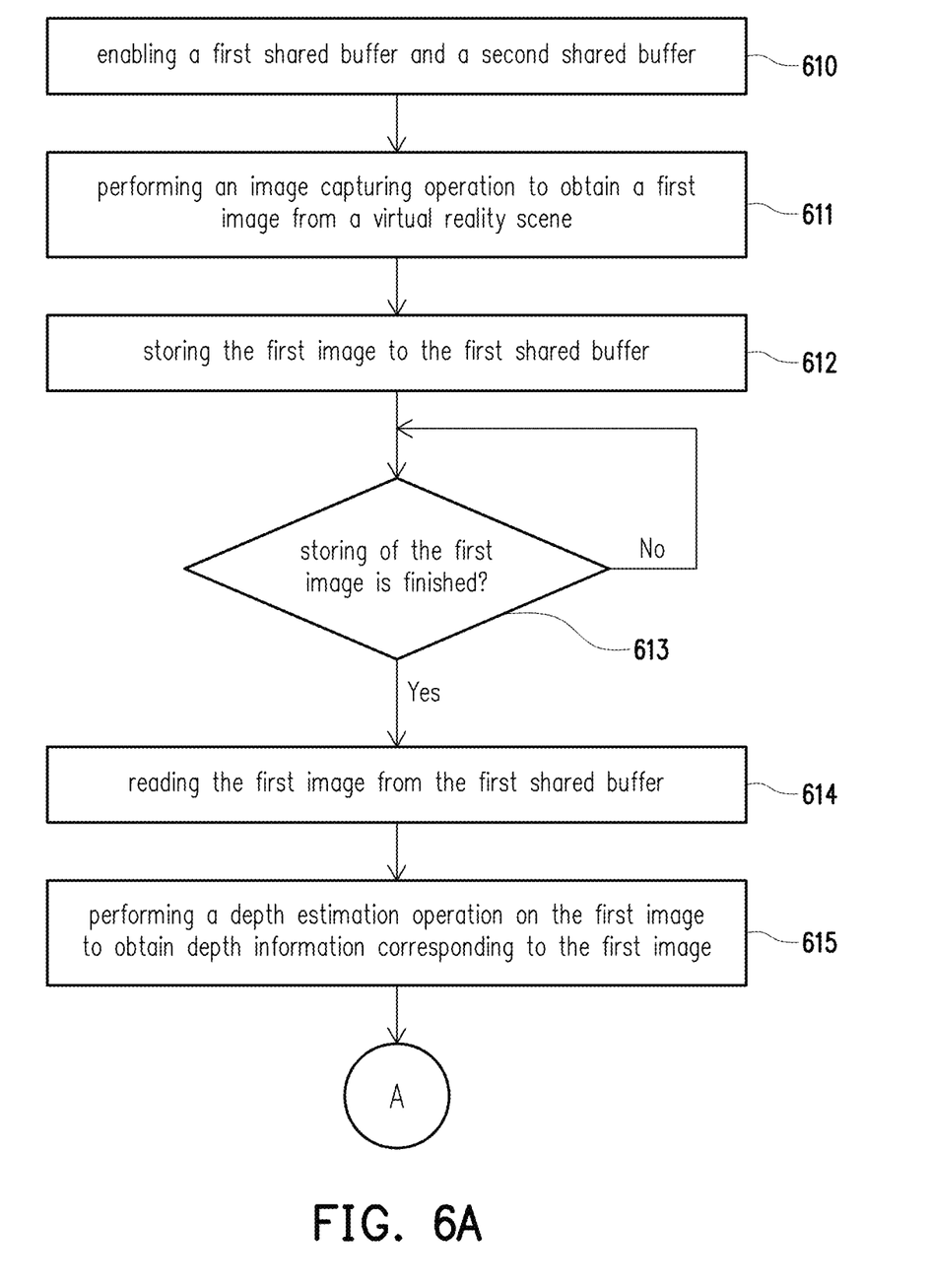
FIG. 6A and FIG. 6B are schematic diagrams of the image processing method according to an embodiment of the invention.
Figure 6B:
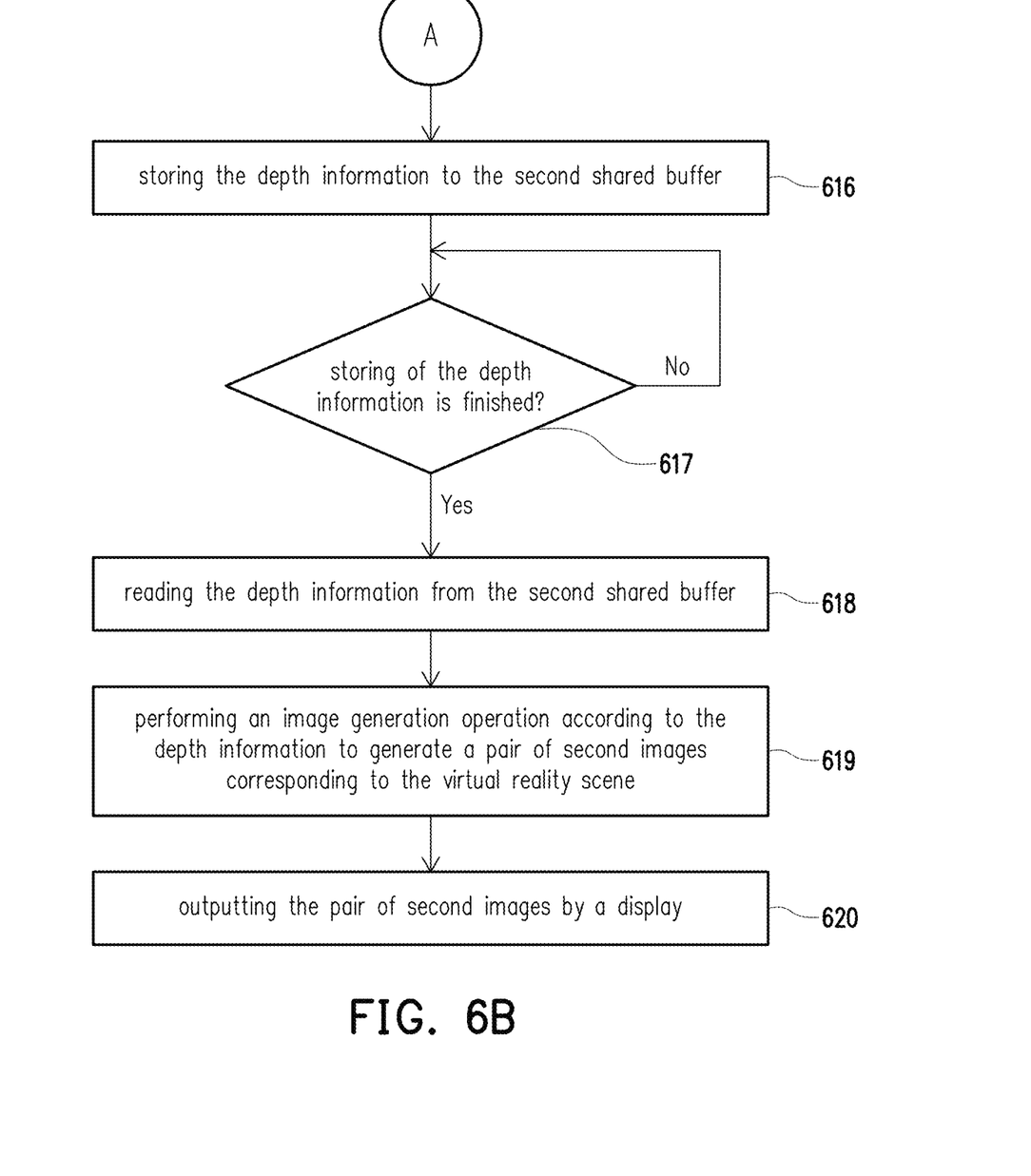

FIG. 6A and FIG. 6B are schematic diagrams of the image processing method according to an embodiment of the invention.

Referring to FIG. 6A, in step 610, a first shared buffer and a second shared buffer are enabled. In step 611, an image capturing operation is performed to obtain a first image from a virtual reality scene. In step 612, the first image is stored to the first shared buffer. In step 613, whether the storing of the first image is finished is determined. If it is determined that the storing of the first image is finished, in step 614, the first image is read from the first shared buffer. If it is determined that the storing of the first image is not finished, step 612 and 613 may be repeated. In step 615, a depth estimation operation is performed on the first image to obtain depth information corresponding to the first image.

Referring to FIG. 6B, in step 616, the depth information is stored to the second shared buffer. In step 617, whether the storing of the depth information is finished is determined. If it is determined that the storing of the depth information is finished, in step 618, the depth information is read from the second shared buffer. If it is determined that the storing of the depth information is not finished, then step 616 and 617 may be repeated. In step 619, an image generation operation is performed according to the depth information to generate a pair of second images corresponding to the virtual reality scene. In step 620, the pair of second images is output by a display of the virtual reality display system.

However, each step in FIG. 6A and FIG. 6B is described in detail above, and is not repeated herein. It should be mentioned that, each step in FIG. 6A and FIG. 6B may be implemented as a plurality of program codes or circuits, and the invention is not limited thereto. Moreover, the methods of FIG. 6A and FIG. 6B may be used with the above exemplary embodiments, and may also be used alone, and the invention is not limited thereto.

Based on the above, by using the shared buffers between different image processing procedures, the efficiency of image processing in the virtual reality display system can be improved.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An image processing method for a virtual reality display system, comprising:
in response to the reading of the first image used in the current frame cycle from the first shared buffer being finished, storing a fourth image obtained from the virtual reality scene to the first shared buffer, wherein the fourth image is used in a next frame cycle later than the current frame cycle, and
the depth estimation operation on the first image used in the current frame cycle and the image capturing operation for obtaining the fourth image used in the next frame cycle are performed simultaneously.

2. The image processing method of claim 1, wherein the step of, in response to that the storing of the first image is finished, reading the first image from the first shared buffer comprises:
in response to that the storing of the first image is finished, updating a first control flag corresponding to the first shared buffer; and
reading the first image from the first shared buffer according to the updated first control flag.

3. The image processing method of claim 1, wherein the step of, in response to that the storing of the depth information is finished, reading the depth information from the second shared buffer comprises:
in response to that the storing of the depth information is finished, updating a second control flag corresponding to the second shared buffer; and
reading the depth information from the second shared buffer according to the updated second control flag.

4. The image processing method of claim 1, wherein the step of performing the depth estimation operation on the first image comprises:
performing an image pre-processing operation on the first image to generate a third image which meets an input requirement of a deep learning model; and
analyzing the third image by the deep learning model to obtain the depth information.

5. The image processing method of claim 4, further comprising:
enabling a third shared buffer;
storing the third image generated by the image pre-processing operation to the third shared buffer;
in response to that the storing of the third image is finished, reading the third image from the third shared buffer; and
inputting the third image to the deep learning model.

6. The image processing method of claim 1, wherein the depth information comprises a depth map.

7. The image processing method of claim 1, wherein the step of performing the image generation operation according to the depth information comprises:
updating the virtual reality scene according to the depth information, the first image and an eye tracking result; and
obtaining the pair of second images from the updated virtual reality scene.

8. The image processing method of claim 1, wherein, at a specific time point, the depth information stored in the second shared buffer and the fourth image stored in the first shared buffer are used in different frame cycles.

9. The image processing method of claim 1, further comprising:
if the depth information stored in the second shared buffer is not updated during the current frame cycle, performing, during the current frame cycle, the image generation operation according to the depth information.

10. A virtual reality display system, comprising:
in response to the reading of the first image used in the current frame cycle from the first shared buffer being finished, storing a fourth image obtained from the virtual reality scene to the first shared buffer, wherein the fourth image is used in a next frame cycle later than the current frame cycle, and
the depth estimation operation on the first image used in the current frame cycle and the image capturing operation for obtaining the fourth image used in the next frame cycle are performed simultaneously.

11. The virtual reality display system of claim 10, wherein the operation of, in response to that the storing of the first image is finished, reading the first image from the first shared buffer comprises:
   in response to that the storing of the first image is finished, updating a first control flag corresponding to the first shared buffer; and
   reading the first image from the first shared buffer according to the updated first control flag.

12. The virtual reality display system of claim 10, wherein the operation of, in response to that the storing of the depth information is finished, reading the depth information from the second shared buffer comprises:
   in response to that the storing of the depth information is finished, updating a second control flag corresponding to the second shared buffer; and
   reading the depth information from the second shared buffer according to the updated second control flag.

13. The virtual reality display system of claim 10, wherein the operation of performing the depth estimation operation on the first image comprises:
   performing an image pre-processing operation on the first image to generate a third image which meets an input requirement of a deep learning model; and
   analyzing the third image by the deep learning model to obtain the depth information.

14. The virtual reality display system of claim 13, further comprising:
   a third shared buffer, coupled to the at least one processor, wherein the at least one processor is further configured to:
      enabling the third shared buffer;
      storing the third image generated by the image pre-processing operation to the third shared buffer;
      in response to that the storing of the third image is finished, reading the third image from the third shared buffer; and
      inputting the third image to the deep learning model.

15. The virtual reality display system of claim 10, wherein the depth information comprises a depth map.

16. The virtual reality display system of claim 10, wherein the operation of performing the image generation operation according to the depth information comprises:
   updating the virtual reality scene according to the depth information, the first image and an eye tracking result; and
   obtaining the pair of second images from the updated virtual reality scene.

17. The virtual reality display system of claim 10, wherein, at a specific time point, the depth information stored in the second shared buffer and the fourth image stored in the first shared buffer are used in different frame cycles.

18. The virtual reality display system of claim 10, wherein the at least one processor is further configured to:
   if the depth information stored in the second shared buffer is not updated during the current frame cycle, perform, during the current frame cycle, the image generation operation according to the depth information.

* * * * *